June 22, 1926.

J. H. McELROY 1,589,477

PROPULSION MECHANISM FOR CHILDREN'S VEHICLES

Filed May 10, 1922

INVENTOR:
John Howard McElroy

Patented June 22, 1926.

1,589,477

UNITED STATES PATENT OFFICE.

JOHN HOWARD McELROY, OF CHICAGO, ILLINOIS, ASSIGNOR TO THE IMPERIAL BRASS MANUFACTURING COMPANY, OF CHICAGO, ILLINOIS, A CORPORATION OF ILLINOIS.

PROPULSION MECHANISM FOR CHILDREN'S VEHICLES.

Application filed May 10, 1922. Serial No. 559,752.

My invention is concerned with vehicles propelled by thrust mechanism, and more especially with a lever operated vehicle in which the thrust is applied through the medium of lazy tongs and is designed to produce a simple construction whereby a wheel may be employed as the propelling or ground engaging element.

It is further concerned with a vehicle of the class described in which the lazy tongs are supplied with a spring pressed yielding bearing that permits of the ground engaging element being pressed into engagement with the ground to any desired extent.

To illustrate my invention I annex hereto a sheet of drawings, in which the same reference characters are used to designate identical parts in all the figures of which—

Figure 1:
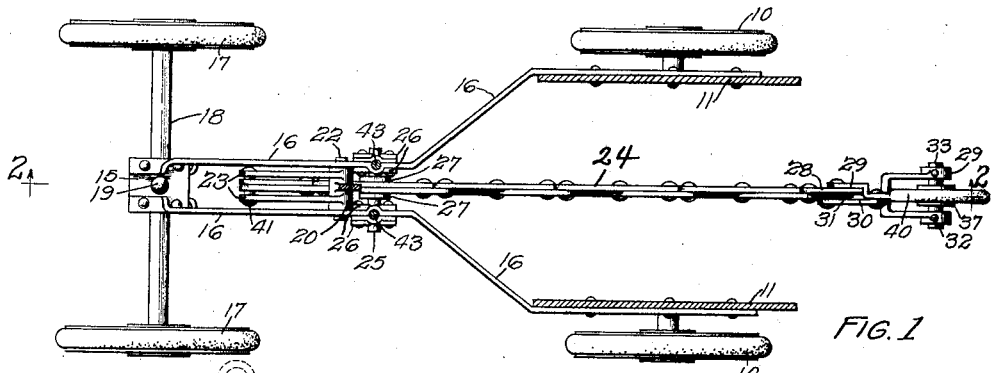
Fig. 1 is a top plan view of a vehicle, in section on the line 1—1 of Fig. 2.

I have shown my invention as applied to a four-wheeled cart in which the rear wheels 10 are journaled on the axles supported by the wheel supports 11 turned down from the plate 12 secured to the under side of the seat 13 and forming a frame of an inverted U-shape in vertical cross-section for supporting the rear wheels, which are also supported by the pair of frame pieces 14 secured to the rear axles and extending forward to the plate 15 to which they are secured. The frame is further braced by the upper side pieces 16 riveted to the sides of the supports 11, and extending forward and downward and riveted at the forward ends to the plate 15. The forward wheels 17 are journaled on the end of an axle 18, which is fulcrumed at its central point upon a pin 19 projecting downward from the center of the plate 15, so that the occupant of the cart sitting on the seat 13 can place his feet on the axle 18 near the wheel 17 and thus steer the same. It will be understood that the details of construction of the frame of the cart and how it is steered form no part of my invention, which is concerned with the propelling mechanism and which may be applied to widely different forms and types of vehicles.

Figure 4:
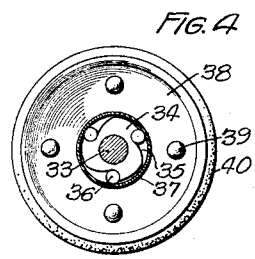
Fig. 4 is a view in section on the line 4—4 of Fig. 3.
Figure 3:
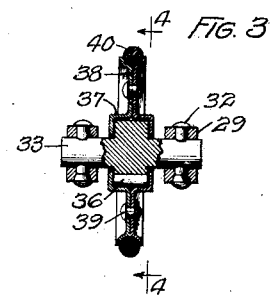
Fig. 3 is a detail in section, on an enlarged scale on the line 3—3 of Fig. 2.

In its preferred form I employ an operating lever 20 having the handle bar 21 and a fulcrum formed by the rod 22 mounted at its ends in the upper side bars 16, which are nearly brought together for this purpose, as clearly shown in Fig. 1. The lower end of the lever 20 takes the form of a fork 23 to which is pivoted the forward end of the lazy tongs 24, which may have as many sections as is desired, and which is preferably fulcrumed at the first cross joint upon the rod 25, which is mounted to slide vertically at each end thereof in the bearings formed by the two pairs of bars 26 secured at their upper ends to the inside and outside of the bars 16 and similarly secured at their lower ends to the bars 14. Collars 27 are secured on the rod 25 on either side of the lazy tongs, so as to prevent the rod 25 from being shifted out of its bearings. On the bar 28 forming a part of the rear section of the lazy tongs I pivot the fork 29 which is connected by the link 30 to the companion piece 31 of the rear section of the lazy tongs and in the end of the fork I secure as by the rivets 32, the bearing rod 33 which has its enlarged disk-like center 34 provided with the plurality of tapered recesses 35, as best shown in Fig. 4. In each of these recesses I place the clutch rollers 36, which are thus held between the disk 34 and the inner wall 37 of the hub cavity of the wheel 38, which is conveniently formed of a pair of disks of the shape shown in cross-section in Fig. 3 and secured together by the rivets 39, and preferably provided with a customary rubber tire 40.

The action of the operation as thus far described is as follows: When the lazy tongs is folded up with the handle 21 in the dotted line position shown in Fig. 1, the wheel 38, which constitutes the propelling element, is in contact with the ground between the wheels 10 and 17, and when the handle is swung rearward to full line position, the lazy tongs are expanded, as shown in full lines. At the beginning of the expansion, the wheel 38 tends to roll to the rear, rotating clockwise, but this movement is immediately stopped, because the clutch rollers 36 are rolled clockwise and brought into the narrow portions of the recesses 35 so that they immediately jam and prevent the wheel 38 from rotating, with the result that it immediately operates as a thrust abutment, so that the expansion of the lazy tongs results in the cart being propelled forwardly. When the handle is swung forward from the full line to the dotted line position of Fig. 2, the wheel 38 tends to roll on the ground in an anti-clockwise direction, and this movement is permitted as the rollers 36 immediately pass to the large portion of the recesses 35, in which they are free to turn and in which position the wheel is free to rotate on the rollers.

Figure 2:
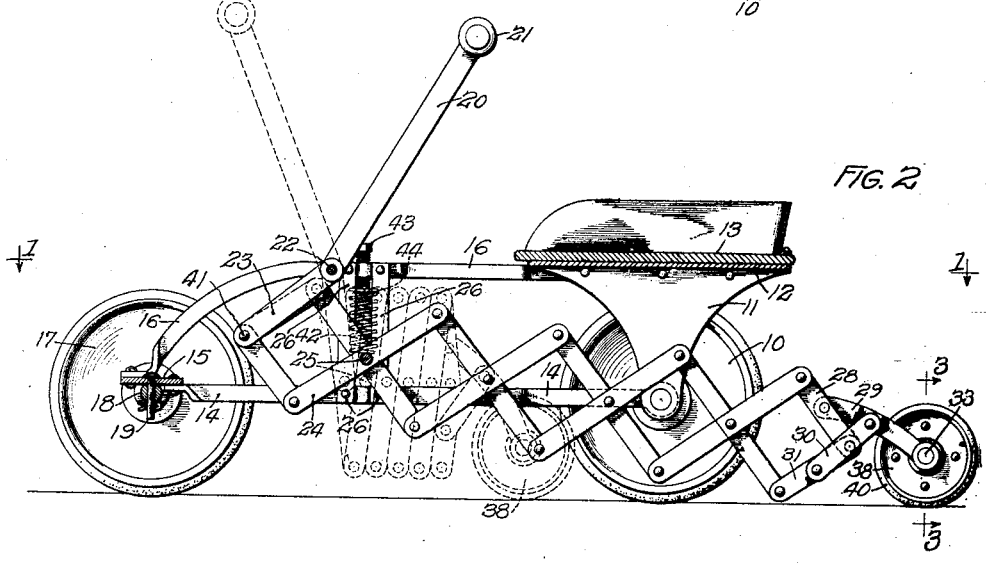
Fig. 2 is a side elevation in section on the line 2—2 of Fig. 1.

By comparison of the full and dotted line positions of Fig. 2, it will be obvious that as soon as the lever 20 begins to move back from the dotted line position, the pivot 41, connecting the fork 23 with the lazy tongs, moves through an arc upward, with the result that the rear end of the lazy tongs is forced downward, as is desirable, within certain limits, to insure the necessary operating engagement of the wheel 38 with the ground. As this downward thrust would be too great before the rearward stroke is completed, I provide the vertical bearings already described for the ends of the rod 25, so that the same can rise, and to regulate the amount of the pressure of the wheel 38 on the ground, I place in the cage-like space formed by the four bars 26 on each side a helically coiled expanding spring 42, and in a threaded aperture formed in the bars 16, I place the set-screws 43 which rest on disks 44 in turn resting on the top of the spring 42, so that by adjusting the set-screws 43, the degree of pressure of the springs 42 can be controlled, and at the same time the rod 25 is free to rise as is necessary during the full expansion of the lazy tongs.

Figure 5:
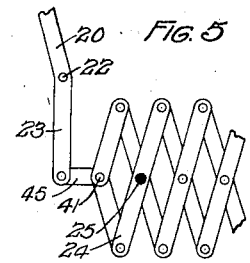
Fig. 5 is a diagrammatic view illustrating a possible modification.

If it is desired to reduce the amount of the downward thrust during the extension of the lazy tongs, I may substitute the alternative arrangement indicated diagrammatically in Fig. 5, where the fork 23, instead of being connected directly to the pivot 41, has the link 45 interposed, with the result that when the lever 20 is pulled rearwardly, the pivot 41 does not have to rise through the arc of a circle with the pivot 22 as a center, but it can move more nearly horizontally, with the link 45 swinging from the horizontal to an inclined position to take care of the curvilinear movement of the end of the fork 23.

While I have shown and described my invention as embodied in the form which I at present consider best adapted to carry out its purposes, it will be understood that it is capable of modifications, and that I do not desire to be limited in the interpretation of the following claims, except as may be necessitated by the state of the prior art.

What I claim as new and desire to secure by Letters Patent of the United States is:

1. In a device of the class described, the combination with a frame, of carrying means mounted thereon, a propelling element, a lazy tongs mounted on the frame and carrying the propelling element on its free end, a lever fulcrumed on the frame and connected with the lazy tongs, and a spring pressed yielding bearing for said lazy tongs, for the purpose described.

2. In a device of the class described, the combination with a frame, of carrying means mounted thereon, a propelling element, a lazy tongs mounted on the frame and carrying the propelling element on its free end, a lever fulcrumed on the frame and connected with the lazy tongs, a spring pressed yielding bearing for said lazy tongs, and means for adjusting the tension of the springs on said bearing.

3. In a device of the class described, the combination with a frame, of carrying means mounted thereon, a propelling element, a lazy tongs mounted on the frame and carrying the propelling element on its free end, a lever fulcrumed on the frame and connected with the lazy tongs, the arrangement and connection of the lever and lazy tongs on the frame being such that as the propelling thrust begins the propelling element is thrown down upon the ground with increasing pressure as the thrust continues, and a spring pressed yielding bearing for the lazy tongs so that the pressure can be regulated.

4. In a device of the class described, the combination with a frame, of carrying means mounted thereon, a propelling element, a lazy tongs pivoted in the frame at an intermediate joint and carrying the propelling element at the end farther from the pivot, a lever fulcrumed in the frame and connected to the lazy tongs at the other end from the propelling element, a bearing for the lazy tongs pivot in which it can slide vertically, and a spring cooperating with the lazy tong pivot to hold it yielding down.

In witness whereof, I have hereunto set my hand this 8th day of May, 1922.

JOHN HOWARD McELROY.